UNITED STATES PATENT OFFICE.

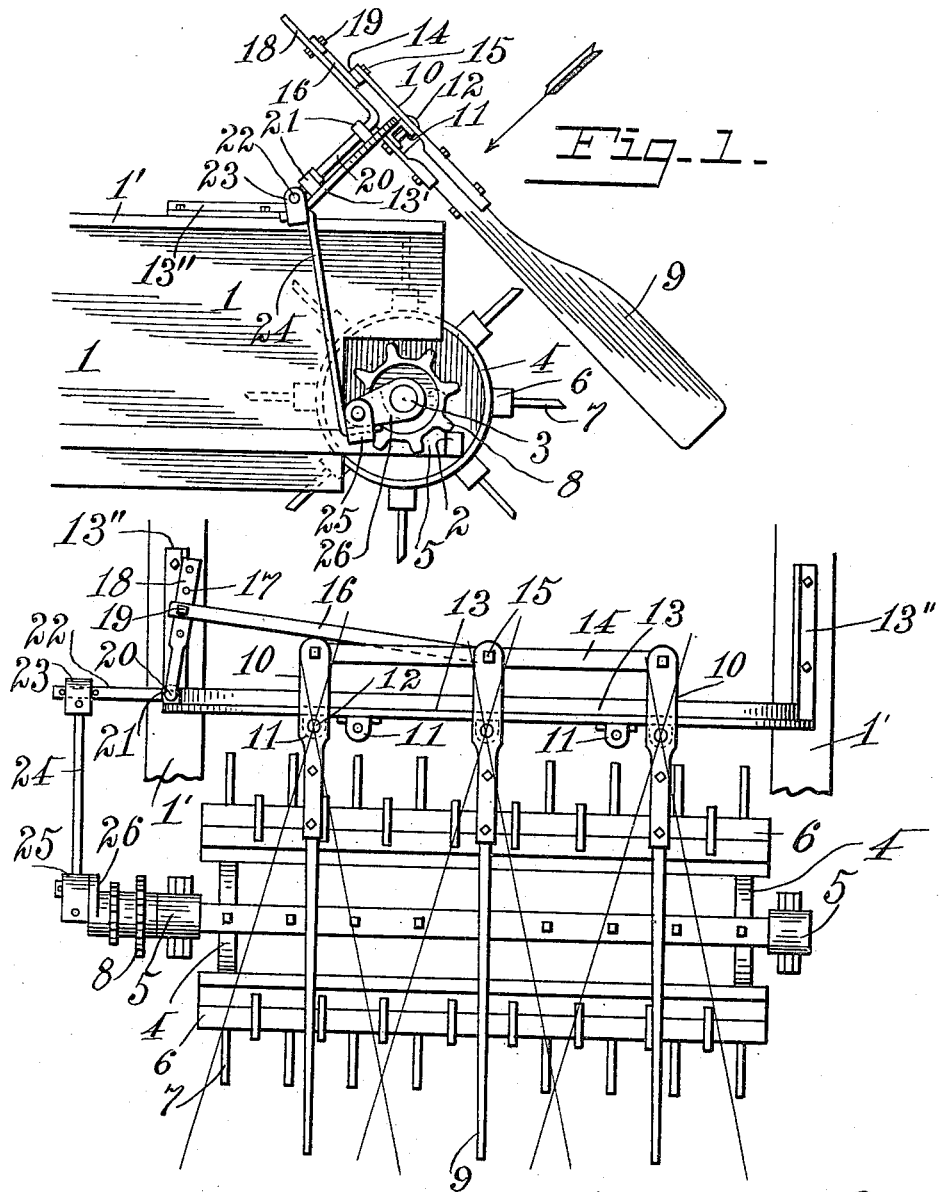

STEPHEN H. GARST, OF MOLINE, ILLINOIS.

MANURE-DISTRIBUTER.

1,215,794.   Specification of Letters Patent.   Patented Feb. 13, 1917.

Application filed August 3, 1914. Serial No. 854,663.

*To all whom it may concern:*

Be it known that I, STEPHEN H. GARST, a citizen of the United States, residing at Moline, in the county of Rock Island and State of Illinois, have invented certain new and useful Improvements in Manure-Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in spreading devices for manure distributers. The regulation type of spreader as heretofore commonly employed is adapted to spread a swath about as wide as the spreader box. To those using this type of farm implement it is advantageous and, therefore, desirable that the swath of manure should be greater than the width of the box. The object of the present invention is, therefore, to provide a spreading device or devices which are capable of spreading a swath wider than the spreader box, and to do this conveniently and at a minimum of exertion. It may be here said that the idea of spreading wide is not new, but heretofore certain disadvantageous and undesirable features have attended the means employed. The principal object of the present invention is to produce a very simple and effective laterally movable spreading device which is capable of sweeping the manure in a wide swath and at the same time add very little additional weight to the machine for the reason that it takes the place of the usual rake or comb. Furthermore, the means for operating the spreading devices is very simple and the material is handled to such mechanical advantage that very little power is required to operate it. It follows, therefore, that the draft is light.

Before describing my improvements in detail, reference is made to the accompanying drawings of which Figure 1 is a side elevation of the rearward end of a manure spreader box having my improvements applied thereto; and Fig. 2 is a top plan view of Fig. 1.

In the detail description of the invention, similar reference characters indicate corresponding parts both in the drawings and description.

The box 1 from which the manure is distributed is of the usual form and very little need be said about it beyond referring to the fact that the lower portion of the rearward end thereof is cut out in order that the cylinder may occupy the proper position relative to the box. The distributing cylinder consists of two end disks 4—4 through which an axle 3 passes and to which the bars 6 are united, said bars supporting the teeth 7, all constructed and arranged in the usual manner. The axle 3 is journaled in suitable bearings 5—5 at the ends thereof which are supported by braces 2 on the sides of the box. Said axle, and therewith the cylinder, is driven from a sprocket chain (not shown) which passes over a sprocket wheel 8.

Coming now to the features involved in my improvements, 9 designates a suitable number of broad face spreader blades or paddles which extend in oblique planes across the distributing cylinder and a suitable distance from the teeth or pins thereof. These spreader blades or paddles may be of different shapes. It is necessary, however, that the said devices shall be broad faced and that they shall project over the discharge side of the cylinder in order that the material shall be effectually spread after it has been discharged by the cylinder. In Fig. 1 one desirable form or shape is shown. The upper ends thereof are rigidly secured to members 10 and 11 which form a lever for each paddle. A yoke or frame formed of angle iron reaches across the upper end of the box and consists of a transverse portion 13 the ends 13' of which are bent downwardly and terminate in straight portions 13" which are securely fastened to the upper box sills 1'. Bearings 11 are secured to this member 13 and these bearings receive bolts 12 which pass through the levers of the paddles 9 and form the pivots upon which the paddles turn in sweeping from one side to the other when operated. The top members 10 of the paddles extend rearwardly of the pivots 12 and each is independently pivoted by means of bolts 15 to a cross-bar 14 lying parallel with the angle-bar 13. This cross-bar 14 is reciprocated longitudinally to impart a sweeping movement to the spreader paddles through the instrumentality of an arm 16. The outer end of this arm 16 is connected to one arm of a double bell-crank lever 20. The arm of this lever to which said bar 16 is coupled is the upper arm 18 which is flattened and provided with a suitable number of openings 17 any one of which may receive a bolt 19 which connects said arm 16. The body of the lever 20 is journaled in suitable bearings 21 which are supported upon one of the down-turned ends 13' of the bar 13. The lower arm or angle 22 of said bell-crank lever 20 is coupled to a crank 26 on the end of the axle 3 of the distributing cylinder. This connection is made through a connecting rod 24 one end of which is connected with a universal member 25 on the axle crank 26 and the other end of which is connected to a universal member 23 on the arm 22 of said lever. It will, therefore, be seen that during the rotations of the distributing cylinder the spreader paddles 9 will be given uniformly reciprocating movements through the actuating arm 16 and the double bell-crank lever 20. A very substantial swing of these paddles is thus produced which causes them to come in sweeping contact with the manure which is delivered between said paddles by the rotating cylinder. The blades strike the manure after it is discharged by the cylinder and spread it in a swath substantially wider than the spreader box. It will be understood that any desirable number of spreader paddles from one to a greater number may be used to suit the various kinds or conditions of material to be spread. When a single spreader blade 9 is employed, the central one of the fulcrum members 11, as shown in Fig. 2, is employed and in the event that two spreader blades are used the two fulcrum members 11 lying between the outermost two paddles and the central blade in Fig. 2 are used.

Having described my invention, I claim—

1. In a manure spreader, the combination with a distributing cylinder, and a wagon body at the rear end of which said cylinder is mounted, of a beater support mounted on said wagon body parallel with said cylinder, a series of broad-faced beaters lying diagonally across the upper rearward face of said cylinder, said beaters being pivotally mounted in such position on said support and widely spaced one from the other, a common connection between said beaters whereby they are movable simultaneously and laterally, and means for actuating said beaters simultaneously and laterally during which the manure is spread in a swath substantially wider than the width of the wagon body.

2. In a manure spreader, the combination with a distributing cylinder, and a wagon body in the rear end of which said cylinder is mounted, of a series of broad-faced beaters mounted diagonally across the upper rearward face of said cylinder and widely spaced one from the other, a supporting bar mounted upon said wagon body above said cylinder and in the rear thereof, said beaters having uniformly pivotal connections with said bar, a reciprocating bar to which the upper forward ends of said beaters are pivoted so that said beaters may be moved in unison upon their pivots, an actuating arm by means of which said beaters are given simultaneous and lateral movements whereby the manure is spread in a swath substantially wider than the wagon body, and means interposed between said actuating arm and the axis of the cylinder whereby such movements are imparted to said beaters.

3. In a manure spreader, the combination with a wagon body, and a distributing cylinder mounted in the rear end thereof, of a series of broad-faced beaters mounted diagonally across the upper rearward face of said cylinder and widely spaced one from the other, a yoke mounted upon said wagon body above and forward of said cylinder and to which said beaters are pivoted with their ends projected forwardly of said yoke, a reciprocating bar coupling the ends of said beaters so projected forward of said yoke, an actuating arm connected to said reciprocating bar, an angular lever fulcrumed upon one end of the yoke and to one end of which said arm is connected, a crank on the axle of the distributing cylinder, a connecting rod, a universal connection between said rod and said angular lever, and a universal connection between said rod and said crank whereby said beaters are simultaneously actuated to spread the manure beyond the sides of the wagon body.

In testimony whereof I affix my signature in presence of two witnesses.

STEPHEN H. GARST.

Witnesses:
SAMUEL E. ARNOLD,
HUBERT BURGIS.

Copies of this patent may be obtained for five cents each, by addressing the "Commissioner of Patents, Washington, D. C."